Jan. 28, 1969    V. A. DEKAN ET AL    3,424,500
CORNER SPROCKET RETAINER AND RELEASE

Filed March 16, 1967

INVENTORS
Vincent A. Dekan
Walter Silks

United States Patent Office 3,424,500
Patented Jan. 28, 1969

3,424,500
CORNER SPROCKET RETAINER AND RELEASE
Vincent A. Dekan, Chicago, and Walter Silks, Downers Grove, Ill., assignors to Westinghouse Air Brake Company, Pittsburgh, Pa., a corporation of Pennsylvania
Filed Mar. 16, 1967, Ser. No. 623,701
U.S. Cl. 299—59     6 Claims
Int. Cl. E21c 1/00

ABSTRACT OF THE DISCLOSURE

Retraction and locking device for trimmer chain corner sprocket of a continuous mining machine. The device comprises a lock arm having a lifting end and a locking end. The lifting end of the lock arm is connected to a power jack. The opposite end of the jack is pivotally connected to a corner sprocket mounting arm, which forms a continuation of the guide for the trimmer chain and is transversely pivoted thereto. A stop on the trimmer chain support is engaged by the lock arm when in its locking position, to transfer the loads from the lock arm pivot to the guide for the trimmer chain, when the sprocket is in its operative position. The admission of fluid under pressure to retract the jack first raises the lock arm out of locking engagement with the corner sprocket mounting arm to the full extent of its travel. The lock arm then forms a reaction member for the jack effecting retraction of the jack and retractable movement of the corner sprocket.

Background of the invention

Heretofore boring types of continuous mining machines having at least two boring heads mining contiguous bores in a mine face have been provided with a trimmer chain to trim the roof and floor of the mine and mine the cusps left between the bores. The trimmer chain has been guided in vertically spaced guides guiding the chain to travel tangentially of the bores along the roof and floor of the mine. The trimmer chain guides have had corner sprockets at each end thereof and have previously employed a retractable support for at least one corner sprocket, which support forms an extension of the guide means for the trimmer chain, when the corner sprocket is extended. Such a retractable corner sprocket is shown in Patent No. 2,890,033 which issued to Walter Silks on June 9, 1959.

The normal cutting loads on the trimmer chain, as well as the loads encountered in maneuvering the machine during mining produce forces tending to collapse the corner sprocket support. These forces are so great that an unduly large jack is required to hold the corner sprocket support in its operative position, which can not readily be contained in the confined space available.

The present invention is an improvement on the structure of Patent No. 2,890,033 in that a relatively small power jack may be used to extend and retract the corner sprocket, and normal loads on the corner sprocket and its support are taken on the lock arm for the corner sprocket and transferred to the main support for the trimmer chain. The power jack also is effective to release the lock arm from one of its ends and is then effectively from its opposite end to move the corner sprocket into its retracted position.

Summary of the invention and objects

The invention generally comprises a single power jack, operative from one end to release the lock arm for the corner sprocket and operable from its other end to lift and move the corner sprocket into a retracted position, together with abutment means for the lock arm, transferring the stresses of mining from the power jack and mounting for the lock arm, to the main support for the trimmer chain.

A principal object of the invention is to provide a simple and improved retractible support and guide for the corner sprocket for the trimmer chain of a continuous mining machine, in which the stresses of mining are transmitted directly to a main support and guide for the trimmer chain when the corner sprocket is in an extended operative position.

Another object of the invention is to provide a simplified and more efficient corner sprocket support and retracting means therefor, operated by a single power jack, connected to extend and retract the support and corner sprocket from one end and to release the locking means from its opposite end.

A further object of the invention is to provide an improved trimmer chain and guide for a continuous mining machine in which the guide for the trimmer chain is articulated and carries a corner sprocket on a movable end thereof, in which a pivoted lock arm locks the corner sprocket in an extended operative position and is engageable with a fixed abutment on the stationary part of the trimmer chain support and guide, to transmit the stresses of mining to the stationary part, and in which a single power jack is operable from one end to lift and release the lock arm, and from the other end to retract the movable end of the guide and corner sprocket mounted thereon.

These and other objects of the invention will become apparent as the following specification proceeds and with reference to the accompanying drawings.

Description of the preferred embodiment

Figure 1:
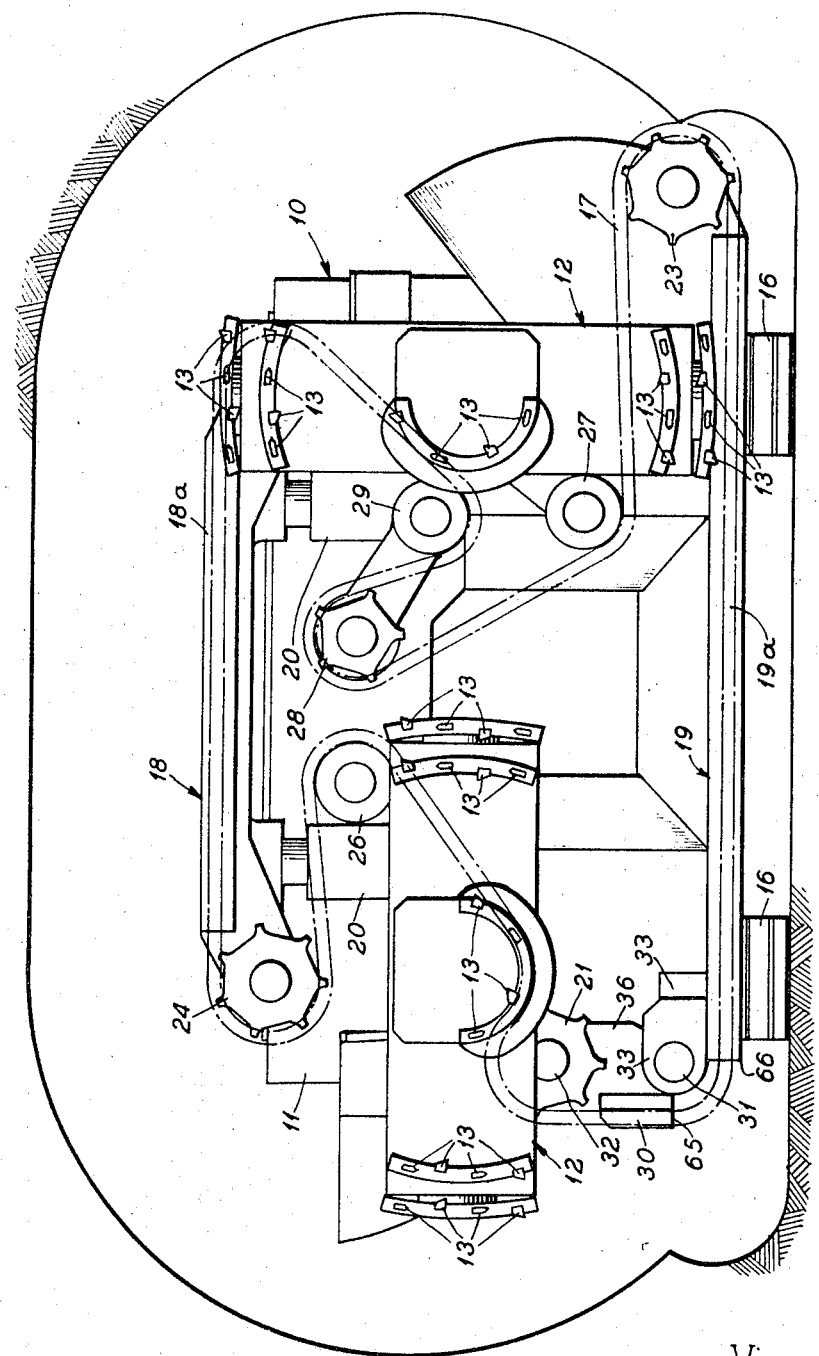
FIGURE 1 is an end view of a continuous mining machine, looking at the machine toward the front end thereof, with certain parts removed, and showing the machine in a retracted position.

In FIGURE 1 of the drawings, we have generally shown a boring type of continuous mining machine 10 having a main supporting housing 11 supported above the ground in front of the main frame (not shown) of the machine. The main supporting housing forms a support for a pair of rotary boring heads 12, having radially spaced rows of cutter bits 13, 13 extending forwardly therefrom for cutting parallel continguous bores in a seam of coal or other mineral material and leaving opposite semi-circular walls or ribs extending along opposite sides of the working place. The main supporting housing 11 also forms a support for drive motors (not shown) for rotatably driving the boring heads 12, and a housing for drive gearing (not shown) drivingly connecting said motors to said boring heads in a conventional manner. The main frame of the machine (not shown) is supported and trammed about the mine on continuous traction tread devices 16, 16 which also serve to feed the boring heads 12 into the working face of the mine.

The continuous mining machine also includes a trimmer chain 17 disposed rearwardly of the boring heads 12 for trimming the cusps between the boring heads and depending from the mine roof and extending upwardly of the mine floor, and for widening the floor to afford greater maneuverability of the machine. The trimmer chain 17 is supported and guided for movement along upper and lower rectilinear trimmer chain supports 18 and 19 respectively having guides 18ª and 19ª extending therealong. The upper trimmer chain support 18 is mounted on the main supporting housing 11 on a pair of laterally spaced vertically extending hydraulic jacks 20, 20, supporting the upper trimmer chain support 18 and guides 18ª to guide the trimmer chain to mine along the roof and to provide a straight roof between the semi-circular ribs of the working place of the mine.

The lower trimmer chain support may similarly be adjustably supported to guide the trimmer chain to mine along the floor and change its direction of travel about corner sprockets 21 and 23 at opposite ends of said guide. The lower trimmer chain support may be elevated above the ground free from the mine floor into its tramming position shown in FIGURE 1, in a conventional manner.

The trimmer chain 17 changes its direction of travel at opposite ends of the upper guide 18ª about corner sprockets 24. A side run of the chain passing about the left hand corner sprocket is trained inwardly to and about an idler 26 and angularly downwardly and outwardly therefrom to and about the corner sprocket 21 along an auxiliary trimmer chain support 30 having guides 30ª extending therealong and transversely pivoted to the trimmer chain support 19 on a pivot pin 31, to form a horizontal continuation of said trimmer chain support.

The chain is driven to travel along the guides 30ª and 19ª from the corner sprocket 21 to the corner sprocket 23. From the corner sprocket 23 the chain is trained under an idler 27 and angularly inwardly and upwardly of said idler about a drive sprocket 28. From the drive sprocket 28 the chain is trained angularly downwardly and outwardly under a tension idler 29 and angularly upwardly and outwardly to a corner sprocket 24, guiding the chain to pass along the upper guide 18ª.

Figure 2:
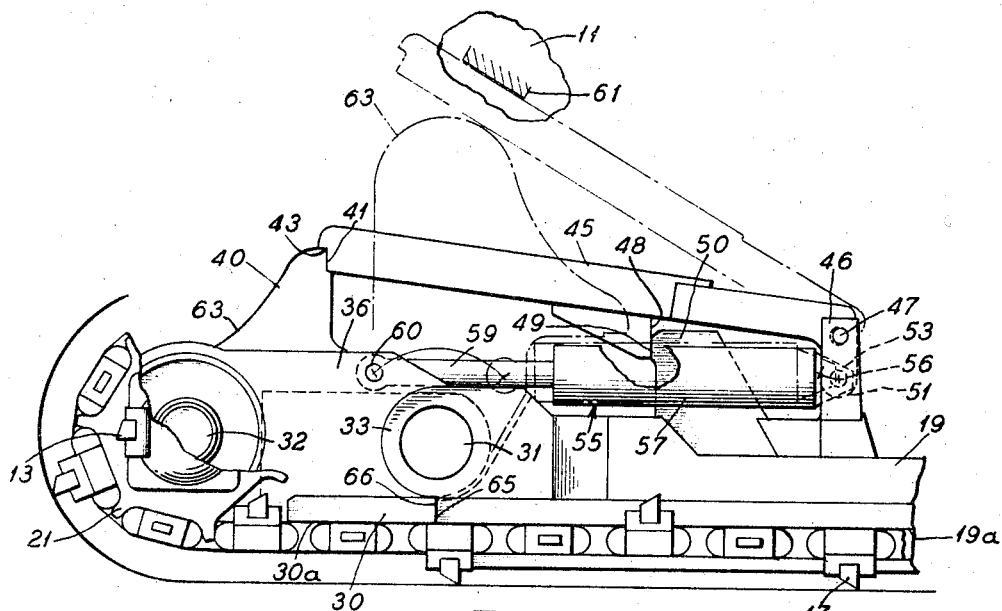
FIGURE 2 is a fragmentary front end view of one corner of the machine, with certain parts broken away in order to show certain details of the locking means for the corner sprocket, locking the corner sprocket in its extended position.
Figure 3:
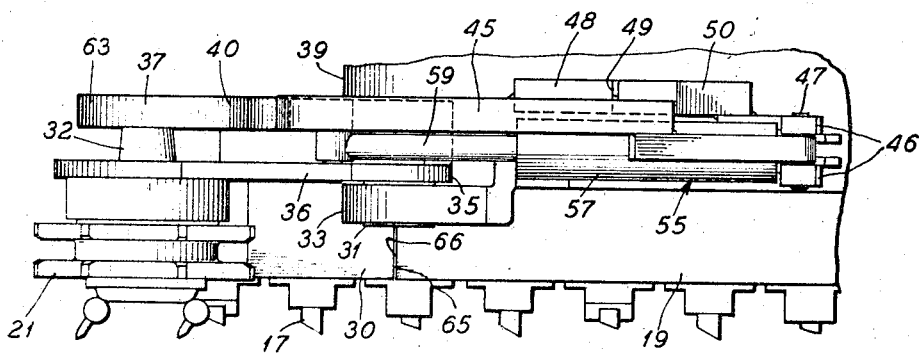
FIGURE 3 is a fragmentary plan view looking down on the corner sprocket and locking means therefor, showing the corner sprocket in its extended position.

Referring now in particular to FIGURES 2 and 3 and the extension and retracting means for the corner sprocket 21, the auxiliary trimmer chain support 30 forms an extension of the support 19 and forms a mounting for the corner sprocket 21 on the outer end of a shaft 32, mounting said corner sprocket to extend beyond the end of the auxiliary trimmer chain support and freely rotate with respect thereto.

It should here be understood that while only one auxiliary trimmer chain support is shown, if desired, auxiliary supports may be provided on opposite ends of the trimmer chain support 19 and may also be mounted on opposite ends of the trimmer chain support 18 and form retractable supports for the corner sprockets 24, 24, where it may be desirable to provide additional retraction for the support particularly where a wider floor is desirable and a wider roof is required to increase the ventilating space about the main supporting housing 11.

As shown in FIGURES 2 and 3, the trimmer chain support 19 has a laterally and upwardly extending boss portion 33 extending along the outer side of a bearing boss 35 formed integrally with the auxiliary trimmer chain support 30 and parallel spaced vertically extending plate portions 36 and 37 extending vertically of said auxiliary trimmer chain support. The plate portions 36 and 37 form mountings at their outer ends for the shaft 32, rotatably supporting the corner sprocket 21.

The plate portion 37 has a dog 40 extending upwardly therefrom having an abutment shoulder 41 on the upper end thereof, adapted to be engaged by a recessed abutment end 43 of a lock arm 45.

The lock arm 45 is disposed above and extends along the auxiliary and main trimmer chain supports 30 and 19 for a portion of the length thereof between upright ears 46, extending upwardly of the trimmer chain support 19. A pivot pin 47 pivotally mounts the lock arm 45 between the ears 46. The fit between the pivot pin 47 and the apertured portion of the lock arm 45 through which the pivot pin extends is relatively loose to accommodate an abutment lug 48 depending from the lock arm 45 to move into engagement with a load bearing shoulder 49 on an abutment dog 50 extending upwardly of the trimmer chain support 19, to transfer the loads of cutting from the pin 47 to the trimmer chain support 19, when the auxiliary trimmer chain support 30 and corner sprocket 21 are in their extended position shown in solid lines in FIGURES 2 and 3.

The lock arm 45 also has a lever arm 51 depending from its point of connection with the pivot pin 47, between the ears 46. Said lever arm 51 is connected at its free end between connector ears 53, extending from the head end of a power jack 55, which is herein shown as a hydraulic jack, although it need not necessarily be a hydraulic jack. A pivot pin 56 conects the lever arm 51 between the ears 53. The power jack 55 is shown as comprising a fluid pressure cylinder 57 having a piston (not shown) therein and a piston rod 59 extending outwardly of said cylinder between the plate portions 36 and 37 and above the pivot 31. The piston rod 59 is pivotally connected between the plate portions 36 and 37, as by a pivot pin 60.

A stop 61 is provided to limit travel of the lock arm 45 to a release position, and to hold said lock arm in this position to afford a fixed abutment for the hydraulic jack 55 upon release of the lock arm, and to thereby effect retractable movement of the piston rod 59 within the cylinder 55 upon the continued admission of fluid under pressure to the piston rod end of the cylinder 57. The stop may be mounted on the front face of the main supporting housing 11 or in certain instances may be the hub (not shown) supporting an associated boring head 12.

The auxiliary trimmer chain support 30 has an abutment face 65 on the inner end thereof, engageable with a vertical abutment face 66 of the trimmer chain support 19, to align the two guides when the corner sprocket 21 is in its extended position shown in FIGURES 2 and 3.

As fluid under pressure is admitted to the piston rod end of the cylinder 57 of the jack 55, said cylinder will first move outwardly along the piston rod 59 toward the auxiliary trimmer chain support 30 and pivot the lock arm 45 in a clockwise direction to release said lock arm 45 from the abutment face 41 of the stop dog 40. The corner sprocket 21 will then be released for movement into its retracted position.

As the lock arm 45 engages the stop 61, said lock arm and the lever arm 51 will form a fixed reaction member for the hydraulic jack 55. The continued admission of fluid under pressure to the piston rod end of the cylinder 57 will then raise the auxiliary trimmer chain support 30 about the axis of the pivot pin 31 and thereby raise the corner sprocket 21 into its retracted position shown in FIGURE 1. The holding of pressure in the cylinder 57 will hold the corner sprocket 21 in its upright retracted position with a face 63 of the plate portion 37, holding the lock arm 45 in engagement with the stop 61. When it is desired to extend the auxiliary trimmer chain support 30 and corner sprocket 21, fluid under pressure may be admitted to the head end of the cylinder 57 to move the corner sprocket and auxiliary trimmer chain support 30 downwardly to engage the abutment face 65 of said auxiliary support 30 with the abutment face 66 of the trimmer chain support 19, to align the trimmer chain supports and the guides 30ª and 19ª extending therealong.

During downward movement of the auxiliary trimmer chain support 30, pressure in the head end of the cylinder 57 will maintain the lock arm 45 in engagement with the face 63 of the plate portion 37. The lock arm 45 will then move along the face 63 and be cammed by the dog 40 to drop into engagement with the abutment face 41 of the stop dog 40, as the auxiliary trimmer chain support 30 is in its fully extended position. The bearing face 48 depending from the lock arm 45 will then be moved into engagement with the load bearing shoulder 49, as pressure on the head end of the cylinder 57 sets the lock. The lock arm 45 will then transmit the forces of mining to said load bearing shoulder 49, relieving the thrust on the pivot pin 47 and also taking the loads from the jack 55.

While we have herein shown and described one form in which the invention may be embodied, it should be understood that various variations and modifications in the invention may be attained without departing from the spirit and scope of the novel concepts thereof.

We claim as our invention:

1. In a mining machine having a frame and boring heads mounted on said frame for rotation about parallel axes, to cut circular bores in a mine face concentric with said axes, a trimmer chain, a first trimmer chain support carried by said frame and having guide means effective to train said trimmer chain for movement along lines substantially tangent to the peripheries of said bores, a second trimmer chain support forming a continuation of said first trimmer chain support and pivotally mounted at one end of said first trimmer chain support and having auxiliary guide means for said trimmer chain and being movable to and from an operative position in which said guide means and said auxiliary guide means are in alignment, the improvement comprising:

a lock arm having pivotal connection with said first trimmer chain support, a lever arm extending from said lock arm, an abutment surface on said second trimmer chain support, said abutment surface being engaged by said lock arm when said second trimmer chain support is in its operative position, an extensible and retractable power jack means pivoted at one end to said lever arm and at its opposite end to said second trimmer chain support, said power jack means being initially operable by movement of said one end to disengage said lock arm from said abutment surface, and being subsequently operable by movement of said opposite end to retract said second trimmer chain support as power is applied to said power jack means to operate said power jack means in a single direction.

2. The structure of claim 1:
   wherein the power jack means is fluid pressure operated, and
   wherein said power jack means effects disengagement of said lock arm by movement of said one end and retraction of said second trimmer chain support by movement of said other end as fluid under pressure is admitted to the same end of said power jack means.

3. The structure of claim 2:
   wherein a stop is provided to limit pivotal movement of said lock arm into a released position and forms a reaction member for said power jack means, whereby the admission of fluid under pressure to one end of said power jack means effects release movement of said lock arm into engagement with said stop, and the continued admission of fluid under pressure to the same end of said power jack means effects retractable movement of said power jack means to move said second trimmer chain support into its retracted position.

4. The structure of claim 1:
   wherein said lock arm has an abutment lug thereon, wherein said first trimmer chain support has a load bearing shoulder thereon, adapted to be engaged by said abutment lug on said lock arm when said lock arm is in a locking position to maintain said second trimmer chain support in its extended operative position, to thereby transfer the loads from said lock arm to said first trimmer chain support independent said pivotal connection.

5. The structure of claim 4:
   wherein a stop is provided to limit pivotal movement of said lock arm into a released position upon the application of power to said power jack means to release said lock arm, whereby said lock arm forms a fixed abutment for said power jack means upon engagement with said stop,
   wherein the continued operation of said power jack means in the same direction effects retractable movement of said second trimmer chain support, and
   wherein the pivotal connection for said lock arm is relatively loose to accommodate the relieving of the loads from said pivotal connection, when the abutment lug on said lock arm is in engagement with said load bearing shoulder on said first trimmer chain support.

6. The structure of claim 4:
   wherein said first trimmer chain support has an abutment face on an outer end thereof engageable with an abutment surface on said second trimmer chain support when the latter is in its operative position, to limit extensible movement of second trimmer chain support, as said lock arm moves into locking engagement with said second trimmer chain support.

References Cited

UNITED STATES PATENTS 2,890,033  6/1959  Silks _____ 299—59
3,350,137  10/1967 Karlovsky _____ 299—61

ERNEST R. PURSER, *Primary Examiner.*